US012168348B2

(12) United States Patent
Inomata et al.

(10) Patent No.: US 12,168,348 B2
(45) Date of Patent: Dec. 17, 2024

(54) TANK UNIT AND LIQUID EJECTION APPARATUS

(71) Applicant: SEIKO EPSON CORPORATION, Tokyo (JP)

(72) Inventors: Satoshi Inomata, Matsumoto (JP); Takanori Matsuda, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 113 days.

(21) Appl. No.: 18/149,832

(22) Filed: Jan. 4, 2023

(65) Prior Publication Data

US 2023/0219337 A1 Jul. 13, 2023

(30) Foreign Application Priority Data

Jan. 7, 2022 (JP) ................................. 2022-001527

(51) Int. Cl.
*B41J 2/175* (2006.01)
*B41J 2/045* (2006.01)

(52) U.S. Cl.
CPC ....... *B41J 2/04501* (2013.01); *B41J 2/17596* (2013.01)

(58) Field of Classification Search
CPC ..... B41J 2/175; B41J 2/17596; B41J 2/17513
See application file for complete search history.

(56) References Cited

U.S. PATENT DOCUMENTS

| | | | | |
|---|---|---|---|---|
| 5,485,187 | A | 1/1996 | Okamura et al. | |
| 9,738,079 | B2 | 8/2017 | Matsushita et al. | |
| 2016/0200110 | A1 | 7/2016 | Matsushita et al. | |
| 2021/0070055 | A1* | 3/2021 | Osborne | B41J 29/02 |

FOREIGN PATENT DOCUMENTS

| | | | | |
|---|---|---|---|---|
| CN | 106004058 A | * 10/2016 | | B41J 2/17509 |
| JP | H05-092578 A | 4/1993 | | |
| WO | 2015/079547 | 6/2015 | | |

* cited by examiner

*Primary Examiner* — Julian D Huffman
(74) *Attorney, Agent, or Firm* — WORKMAN NYDEGGER

(57) ABSTRACT

A tank unit is configured to introduce liquid supplied from a container and to lead out liquid toward a head configured to eject the liquid. The tank unit includes a storage section that stores the liquid supplied from the container, an introduction section that introduces the liquid supplied from the container into the storage section, an atmosphere opening section configured to open inside of the storage section to atmosphere, and an outlet section that leads out the liquid stored in the storage section. The introduction section is connected to the storage section, extends in a vertical direction in the storage section, and has an open end located within the storage section. The storage section includes a blocking section including a first protruding section located at a position in the vertical direction facing the open end and a second protruding section extending upward from the first protruding section.

9 Claims, 5 Drawing Sheets

TANK UNIT AND LIQUID EJECTION APPARATUS

The present application is based on, and claims priority from JP Application Serial Number 2022-001527, filed Jan. 7, 2022, the disclosures of which is hereby incorporated by reference herein in its entirety.

BACKGROUND

1. Technical Field

The present invention relates to, for example, a tank unit and a liquid ejection apparatus.

2. Related Art

JP-A-5-92578 describes a liquid ejection apparatus including a tank unit into which liquid is introduced from a container for containing the liquid, and a head for ejecting the liquid. The liquid stored in the tank unit is supplied to the head In such a liquid ejection apparatus, when the posture is inclined, the liquid level in the tank unit may become high. In this case, for example, when the liquid level in the tank unit becomes higher than the head, the liquid may flow out from the head.

SUMMARY

A tank unit that overcomes the above-described problems is configured to introduce liquid supplied from a container and to lead out liquid toward a head configured to eject the liquid, the tank unit including a storage section that stores the liquid supplied from the container, an introduction section that introduces the liquid supplied from the container into the storage section using a hydraulic head difference, an atmosphere opening section configured to open inside of the storage section to atmosphere, and an outlet section that leads out the liquid stored in the storage section, wherein the introduction section is connected to the storage section, extends in a vertical direction in the storage section, and has an open end located within the storage section, the storage section includes a blocking section including a first protruding section located at a position facing the open end in the vertical direction and a second protruding section extending upward from the first protruding section, and a length of a horizontal component in the first protruding section is longer than a length of a horizontal component in the open end.

A liquid ejection apparatus that overcomes the above-described problems includes the above-described tank unit, and a head that ejects liquid supplied from the tank unit.

DESCRIPTION OF EMBODIMENTS

Hereinafter, an embodiment of a liquid ejection apparatus including a tank unit will be described with reference to the drawings. The liquid ejection apparatus is, for example, an ink jet printer that records images such as characters or photographs by ejecting ink, which is an example of liquid, onto a medium such as paper or fabric. In the present specification, when a description is given based on the vertical direction and the horizontal direction, it is assumed that the liquid ejection apparatus is installed horizontally unless otherwise specified.

Figure 1:
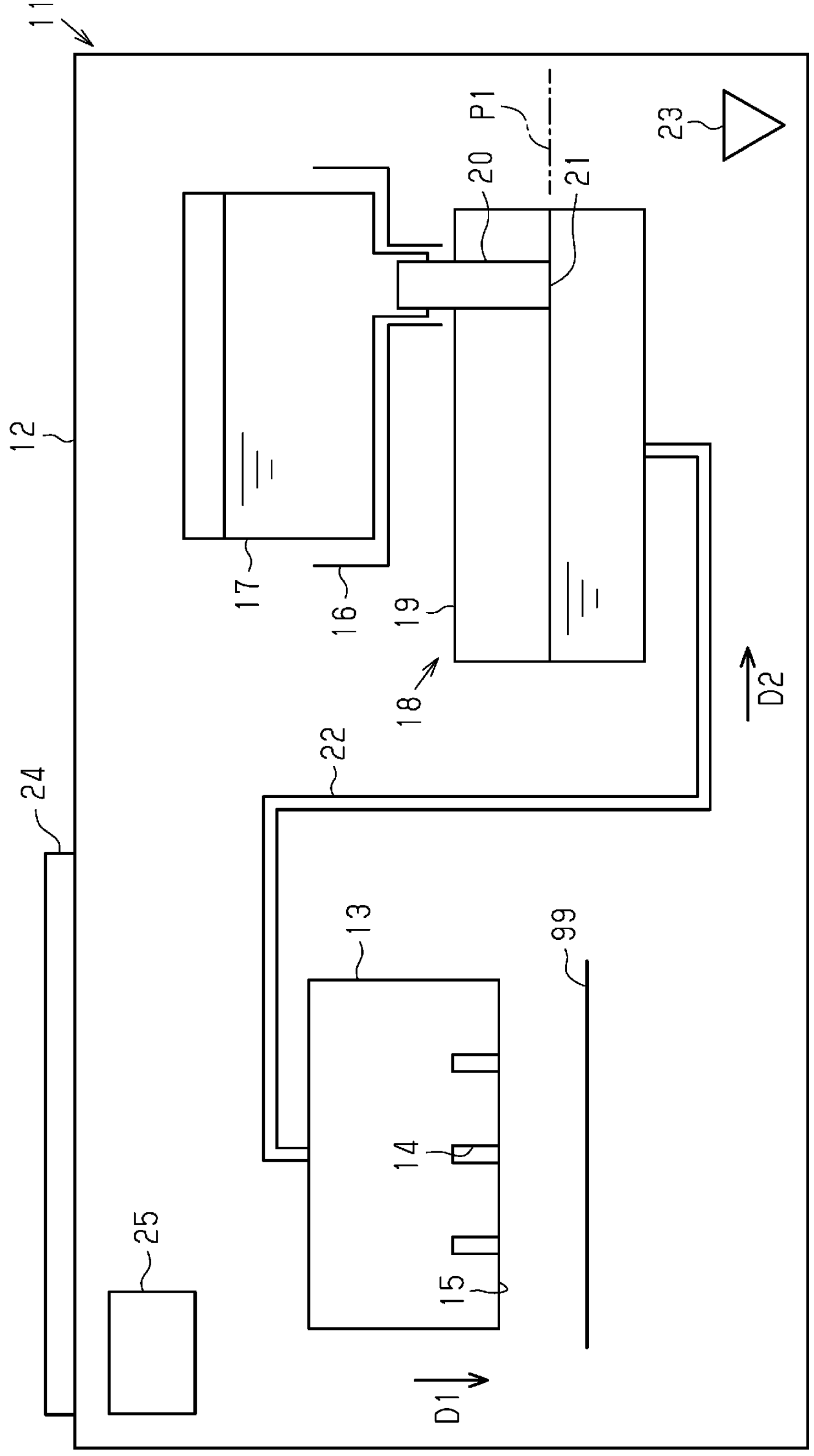
FIG. 1 is a schematic view showing an example of a liquid ejection apparatus including a tank unit.

As shown in FIG. 1, the liquid ejection apparatus 11 includes a housing 12. The housing 12 is installed horizontally, for example.

The liquid ejection apparatus 11 includes a head 13. The head 13 is housed in the housing 12. The head 13 is configured to eject liquid. The head 13 has nozzles 14 and a nozzle surface 15. The nozzles 14 are opened in the nozzle surface 15. The nozzles 14 eject liquid. The head 13 performs printing on a medium 99 by ejecting liquid from the nozzles 14 onto the medium 99.

The liquid ejection apparatus 11 includes a mounting section 16. The mounting section 16 is accommodated in the housing 12, for example. The mounting section 16 is configured such that the container 17 can be mounted thereon. The container 17 contains liquid. The container 17 is, for example, an ink cartridge. When the container 17 is attached to the mounting section 16, the liquid can be supplied from the container 17 to the head 13.

The liquid ejection apparatus 11 includes a tank unit 18. The tank unit 18 is configured to be able to introduce the liquid supplied from the container 17. The tank unit 18 is configured to be able to lead the liquid out toward the head 13.

The tank unit 18 includes a storage section 19 and an introduction section 20. The storage section 19 is configured to store liquid. The storage section 19 stores the liquid supplied from the container 17. Specifically, the storage section 19 stores the liquid supplied from the container 17 through the introduction section 20. The inside of the storage section 19 is open to atmosphere. The storage section 19 is located below the container 17.

The introduction section 20 is configured to introduce the liquid into the storage section 19. The introduction section 20 introduces the liquid supplied from the container 17 into the storage section 19 using hydraulic head difference. The introduction section 20 is connected to the container 17 by, for example, mounting the container 17 on the mounting section 16. By this, the liquid flows from the container 17 to the introduction section 20.

The introduction section 20 is connected to the storage section 19. The introduction section 20 extends from inside to outside the storage section 19. The introduction section 20, for example, extends in the vertical direction D1 to outside the storage section 19. The introduction section 20, for example, extends in the vertical direction D1 to inside the storage section 19.

The introduction section 20 has an open end 21. The open end 21 is an end portion of the introduction section 20. The open end 21 is located in the storage section 19. The open end 21 is a downstream end of the introduction section 20. Liquid is introduced into storage section 19 through open end 21.

Liquid is introduced into the storage section 19 up to the height of the open end 21. Therefore, the position of the open end 21 is the standard position P1 of the liquid surface in the storage section 19. The standard position P1 is lower than the nozzle surface 15. As a result, the pressure in the head 13 becomes negative. The standard position P1 is the position of the liquid surface when liquid is supplied to the storage section 19 in the normal manner while the housing 12 is horizontally installed.

The liquid is supplied from the container 17 to the storage section 19 by a hydraulic head difference between the container 17 and the storage section 19. The liquid is introduced from the container 17 into the storage section 19 through the introduction section 20 by air in the storage section 19 entering into the container 17 through the introduction section 20. When the liquid surface in the storage section 19 reaches the open end 21, the open end 21 is blocked by the liquid, and thus introduction of the liquid is stopped. A detailed configuration of the tank unit 18 will be described later.

The liquid ejection apparatus 11 includes a supply flow path 22. The supply flow path 22 is a flow path for supplying the liquid from the tank unit 18 to the head 13. The supply flow path 22 is connected to the tank unit 18 and the head 13. Specifically, the supply flow path 22 is connected to the storage section 19 and the head 13. The supply flow path 22 may include, for example, a tube or a pipe. The liquid ejection apparatus 11 may include a valve, a pump, and the like in the middle of the supply flow path 22.

The liquid ejection apparatus 11 includes a detection section 23. The detection section 23 is configured to detect an inclination angle of the tank unit 18 with respect to horizontal. The detection section 23 is, for example, a gyro sensor. The detection section 23 is attached to the housing 12, for example. The detection section 23 may be attached to the tank unit 18. The detection section 23 detects the inclination angle of the tank unit 18 by detecting the inclination angle of the housing 12, for example. When the housing 12 is horizontal, the tank unit 18 is horizontal.

When the posture of the housing 12 is inclined, there is a concern that the positional relationship between the liquid surface in the storage section 19 and the nozzle surface 15 will reverse. Specifically, there is a concern that when the posture of the housing 12 is inclined, the liquid surface in the storage section 19 will become higher than the nozzle surface 15. When the liquid level in the storage section 19 becomes higher than the nozzle surface 15, the liquid may flow out from the nozzles 14.

When the posture of the tank unit 18 inclines, the liquid surface and the open end 21 may separate from each other in the storage section 19. When the liquid surface and the open end 21 separate from each other, air in the storage section 19 enters the container 17 through the open end 21, and thus the liquid is introduced from the container 17 into the storage section 19. That is, the amount of liquid in the storage section 19 increases more than usual. When the liquid amount in the storage section 19 increases, the liquid level in the storage section 19 rises. There is a concern that when the liquid surface in the storage section 19 becomes high, the positional relationship between the liquid surface in the storage section 19 and the nozzle surface 15 may reverse.

When the positional relationship between the liquid surface in the storage section 19 and the nozzle surface 15 reverses due to inclination of the posture of the tank unit 18, for example, it is necessary to lower the liquid surface height in the storage section 19 by discharging the liquid from the head 13. Therefore, there is a concern that the liquid will be wastefully consumed when the positional relationship between the liquid surface in the storage section 19 and the nozzle surface 15 reverses due an incline in to the posture of the tank unit 18. Therefore, it is preferable that the liquid ejection apparatus 11 is used in a posture close to horizontal. Therefore, it is preferable that the liquid ejection apparatus 11 be transported in a posture close to horizontal.

The liquid ejection apparatus 11 includes a notification section 24. The notification section 24 is configured to notify information to the user. The notification section 24 is attached to the housing 12. The notification section 24 is, for example, a display. The notification section 24 notifies the user of information by displaying a message, for example. The notification section 24 may be, for example, a speaker that notifies the user of information by generating sound, or a lamp that notifies the user of information by emitting light.

The liquid ejection apparatus 11 includes a controller 25. The controller 25 is configured to control the liquid ejection apparatus 11. The controller 25 controls, for example, the head 13, the notification section 24, and the like. The controller 25 may be one or more processors that execute various processes in accordance with computer programs. The controller 25 may be one or more dedicated hardware circuits such as an application-specific integrated circuit that executes at least a part of various processes. The controller 25 may be a circuit including a combination of a processor and a hardware circuit. The processor includes a CPU and memory such as RAM and ROM. The memory stores program code or instructions configured to cause the CPU to perform operations. The memory, that is, the computer-readable medium, includes any readable medium that can be accessed by a general purpose or special purpose computer.

When the inclination angle of the tank unit 18 exceeds a predetermined angle, the controller 25, for example, causes the notification section 24 to notify that the inclination angle exceeds the predetermined angle. The controller 25, for example, compares the inclination angle detected by the detection section 23 with a predetermined angle, which is a threshold value. The threshold value is stored in the controller 25. The threshold value is, for example, 3 degrees. For example, when the inclination angle of the tank unit 18 exceeds 3 degrees, there is a concern that the positional relationship between the liquid surface in the storage section 19 and the nozzle surface 15 may reverse.

When the inclination angle detected by the detection section 23 exceeds the threshold value, the controller 25, for example, causes the notification section 24 to notify that the inclination angle exceeds a predetermined angle. By this, the user can change the posture of the liquid ejection apparatus 11.

When the inclination angle of the tank unit 18 has exceeded the predetermined angle, the controller 25 may cause the notification section 24 to notify a request for reducing the inclination angle of the tank unit 18. In this case, for example, the controller 25 may cause the notification section 24 to notify with a message prompting the posture of the liquid ejection apparatus 11 to approach closer to horizontal.

The controller 25, for example, may prohibit printing when the detection section 23 detects that the inclination angle of the tank unit 18 has exceeded a predetermined angle. The controller 25, for example, may cause the notification section 24 to notify an error when the detection section 23 detects that the inclination angle of the tank unit 18 has exceeded a predetermined angle. In this case, the controller 25 does not start printing even if a print command is received from the user.

The controller 25 may compare the inclination angle of the tank unit 18 acquired at the time that the liquid ejection apparatus 11 is turned on with the threshold value, or may always compare the inclination angle of the tank unit 18 with the threshold value during operation of the liquid ejection apparatus 11. By this, the user can use the liquid ejection apparatus 11 in a state in which the liquid ejection apparatus 11 is installed in a horizontal posture or in a posture close to the horizontal posture.

Next, the tank unit 18 will be described in detail.

Figure 2:
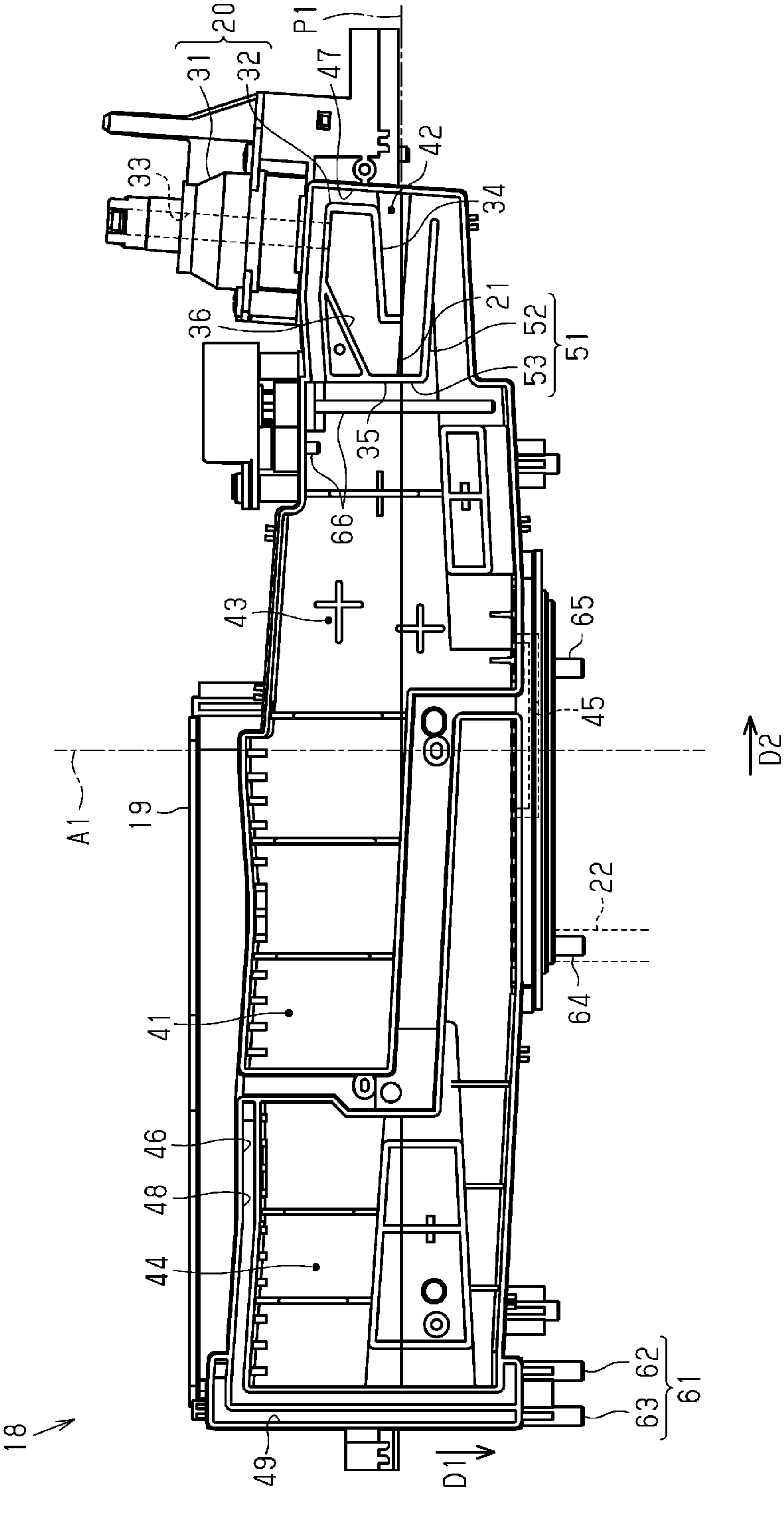
FIG. 2 is a front view of the tank unit.

As shown in FIG. 2, the introduction section 20 is located closer in the longitudinal direction of the storage section 19 to one end side of the storage section 19 than is a reference line A1. The reference line A1 is a virtual line passing through the center position of the storage section 19 in the longitudinal direction of the storage section 19. When the tank unit 18 is horizontal, the storage section 19 has, for example, a shape elongated in a horizontal direction D2. Therefore, the introduction section 20 is located closer to the one end side of the storage section 19 than the center position of the storage section 19 in the horizontal direction D2. When the tank unit 18 is horizontal, the reference line A1 extends in a vertical direction D1.

The introduction section 20 includes a first introduction section 31 and a second introduction section 32.

The first introduction section 31 extends to outside the storage section 19. The first introduction section 31, for example, extends in the vertical direction D1. The first introduction section 31 is, for example, a tube inserted into the container 17. The first introduction section 31, for example, is inserted into the container 17 mounted to the mounting section 16. The first introduction section 31 is not limited to being directly connected to the container 17, and may be indirectly connected to the container 17 via another member.

The first introduction section 31 has a first introduction path 33. The first introduction path 33 is a flow path through which liquid flows. The first introduction path 33 extends inside the first introduction section 31. The first introduction path 33 extends so as to penetrate inside to outside of the storage section 19.

The second introduction section 32 extends in the storage section 19. The second introduction section 32 extends, for example, in the vertical direction D1. The second introduction section 32 extends in the horizontal direction D2, for example. The open end 21 is located at an end portion of the second introduction section 32. The second introduction section 32 is constituted by, for example, a plurality of ribs extending from the storage section 19.

The second introduction section 32 includes, for example, a horizontal portion 34 and a vertical portion 35. The horizontal portion 34 is a portion in the second introduction section 32 extending in the horizontal direction D2. The horizontal portion 34 is constituted, for example, by a rib extending in the horizontal direction D2. The first introduction path 33 opens into the horizontal portion 34. The horizontal portion 34, for example, extends from a portion where the first introduction path 33 opens so as to approach the reference line A1. The vertical portion 35 is a portion in the second introduction section 32 extending in the vertical direction D1. The vertical portion 35 is constituted by a rib extending in the vertical direction D1. The open end 21 is located at the end of the vertical portion 35. The horizontal portion 34 and the vertical portion 35 are connected to each other.

The second introduction section 32 extends in the horizontal direction D2 and in the vertical direction D1 by means of the horizontal portion 34 and the vertical portion 35. Therefore, the second introduction section 32 extends while bending. The second introduction section 32 may be configured to extend only in the vertical direction D1.

The second introduction section 32 has a second introduction path 36. The second introduction path 36 is a flow path through which liquid flows. The second introduction path 36 extends in the storage section 19. The second introduction path 36 communicates with the first introduction path 33. The second introduction path 36 is defined by the second introduction section 32. The second introduction path 36 is defined by the horizontal portion 34 and the vertical portion 35. Therefore, the second introduction path 36 extends in the horizontal direction D2 and in the vertical direction D1. The second introduction path 36 opens to the open end 21.

The storage section 19 includes a storage chamber 41. The storage chamber 41 is a space in the storage section 19. The storage chamber 41 is defined by, for example, attaching a film to a case constituting the storage section 19. The storage chamber 41 may be defined by attaching a plate-shaped member made of the same material as the case to the case constituting the storage section 19. The storage chamber 41 includes, for example, an introduction chamber 42, a first storage chamber 43, and a second storage chamber 44.

The introduction chamber 42 is a space that communicates with the second introduction path 36. The introduction chamber 42 is defined by the second introduction section 32 and a blocking section 51 (to be described later). Liquid that has passed through the introduction section 20 accumulates in the introduction chamber 42.

The first storage chamber 43 is a space communicating with the introduction chamber 42. Liquid that has passed through the introduction chamber 42 accumulates in the first storage chamber 43.

The second storage chamber 44 is a space communicating with the first storage chamber 43. The liquid that has passed through the first storage chamber 43 accumulates in the second storage chamber 44.

The introduction chamber 42, the first storage chamber 43, and the second storage chamber 44 are arranged in the storage section 19 in the longitudinal direction of the storage section 19, for example. In FIG. 2, the second storage chamber 44, the first storage chamber 43, and the introduction chamber 42 are arranged horizontally in this order in the horizontal direction D2. When the tank unit 18 is horizontal, the liquid level in the introduction chamber 42, the liquid level in the first storage chamber 43, and the liquid level in the second storage chamber 44 coincide with each other.

The storage section 19 has a connection path 45. The connection path 45 is a flow path communicating with the first storage chamber 43 and the second storage chamber 44. The connection path 45 communicates with, for example, a lower portion of the first storage chamber 43. The connection path 45 communicates with, for example, a lower portion of the second storage chamber 44. The liquid that accumulated in the first storage chamber 43 is introduced into the second storage chamber 44 through the connection path 45.

The storage section 19 may have a one way valve located in the connection path 45. The one way valve, for example, allows liquid to flow from the first storage chamber 43 toward the second storage chamber 44. The one way valve, for example, restricts liquid from flowing from the second storage chamber 44 toward the first storage chamber 43.

The storage section 19 has an atmosphere opening path 46. The atmosphere opening path 46 is a flow path that opens the storage chamber 41 to atmosphere. Air flows through the atmosphere opening path 46. The atmosphere opening path 46 includes, for example, an introduction opening path 47, a first opening path 48, and a second opening path 49.

The introduction opening path 47 is a flow path for opening the introduction chamber 42 to atmosphere. The introduction opening path 47 communicates with the introduction chamber 42. The introduction opening path 47 communicates with the first storage chamber 43. Therefore, the introduction opening path 47 connects the introduction chamber 42 and the first storage chamber 43. The introduction opening path 47 communicates with, for example, an upper portion of the introduction chamber 42. The introduction opening path 47 communicates with, for example, an upper portion of the first storage chamber 43. The introduction opening path 47 extends so as to bypass the second introduction path 36. In particular, the introduction opening path 47 extends so as to surround the horizontal portion 34. By this, the space in the storage section 19 is effectively utilized.

A first opening path 48 is a flow path for opening the first storage chamber 43 to atmosphere. The first opening path 48 communicates with the first storage chamber 43. The first opening path 48 communicates with, for example, an upper portion of the first storage chamber 43. The first opening path 48 communicates with the outside of the storage section 19. That is, the first opening path 48 communicates with atmosphere. The introduction chamber 42 and the first storage chamber 43 are opened to atmosphere via the first opening path 48.

The second opening path 49 is a flow path for opening the second storage chamber 44 to atmosphere. The second opening path 49 communicates with the second storage chamber 44. The second opening path 49 communicates with, for example, an upper portion of the second storage chamber 44. The second opening path 49 communicates with the outside of the storage section 19. That is, the second opening path 49 communicates with atmosphere. The second storage chamber 44 is opened to atmosphere via the second opening path 49.

The storage section 19 may have a moisture permeable membrane between the atmosphere opening path 46 and the storage chamber 41. The storage section 19, for example, may include a moisture permeable film between the first opening path 48 and the first storage chamber 43 and between the second opening path 49 and the second storage chamber 44. The moisture-permeable membrane is a membrane through which gas can pass but liquid cannot pass. The moisture permeable film reduces the concern that liquid flows into atmosphere opening path 46.

The storage section 19 includes the blocking section 51. The blocking section 51 is configured to block introduction of liquid when the posture of the tank unit 18 inclines. The blocking section 51 blocks introduction of liquid so that the positional relationship between the liquid surface in the storage section 19 and the nozzle surface 15 does not reverse. The blocking section 51, for example, is configured to block the introduction of liquid when the inclination angle of the tank unit 18 exceeds 8 degrees. Specifically, the blocking section 51 blocks introduction of liquid when the posture of the tank unit 18 inclines such that one end side of the storage section 19 is displaced upward, that is, the introduction section 20 is displaced upward.

Figure 3:
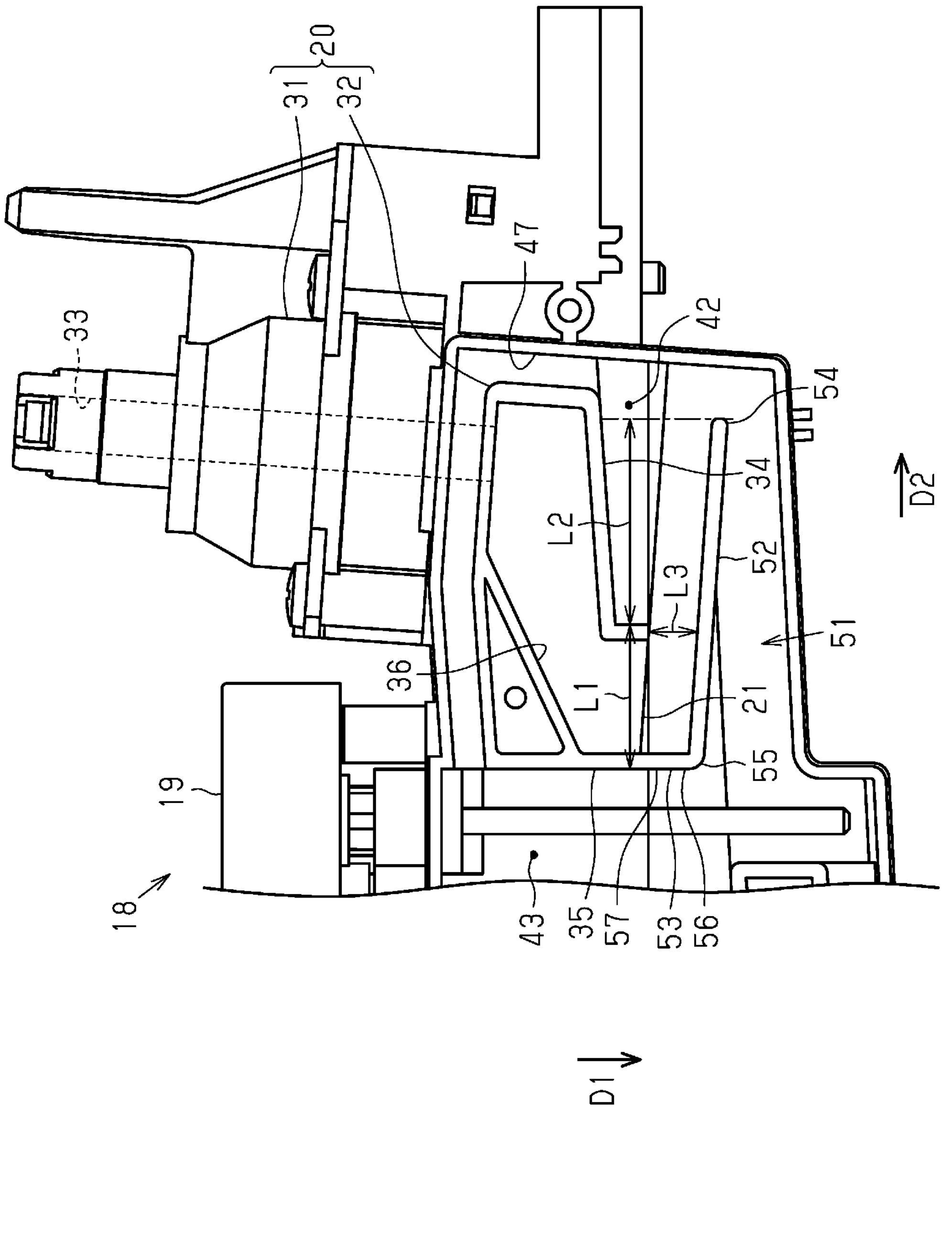
FIG. 3 is an enlarged view of FIG. 2

As shown in FIG. 3, the blocking section 51 includes a first protruding section 52 and a second protruding section 53. The first protruding section 52 and the second protruding section 53 are, for example, ribs. The first protruding section 52 and the second protruding section 53 extend, for example, from a case constituting the storage section 19.

The first protruding section 52 is located below the second introduction section 32. The first protruding section 52 is located below the open end 21. The first protruding section 52 is located at a position facing the open end 21 in the vertical direction D1. Therefore, the first protruding section 52 receives liquid introduced from the introduction section 20.

The first protruding section 52 extends overall in the horizontal direction D2. The first protruding section 52, for example, overlaps the horizontal portion 34 and the vertical portion 35 as viewed from the vertical direction D1. That is, the first protruding section 52 faces the horizontal portion 34 and the vertical portion 35 in the vertical direction D1. The first protruding section 52, for example, extends in the horizontal direction D2 from a position facing the open end 21 so as to separate from the reference line A1. Since the first protruding section 52 extends below the horizontal portion 34, the space in the storage section 19 is effectively utilized.

The first protruding section 52 has a first end portion 54 and a second end portion 55. The first end portion 54 and the second end portion 55 are end portions of the first protruding section 52. Among both ends of the first protruding section 52, the first end portion 54 is an end at an intermediate position of the storage section 19 in the horizontal direction D2, that is, the end far from the reference line A1. Among both ends of the first protruding section 52, the second end portion 55 is an end at an intermediate position of the storage section 19 in the horizontal direction D2, that is, the end near to the reference line A1. Accordingly, the distance in the horizontal direction D2 between the reference line A1 and the first end portion 54 is greater than the distance between the reference line A1 and the second end portion 55. The first end portion 54, for example, overlaps the horizontal portion 34 as viewed from the vertical direction D1. The second end portion 55, for example, overlaps the vertical portion 35 as viewed from the vertical direction D1.

The first protruding section 52 is inclined downward from the second end portion 55 toward the first end portion 54. Therefore, the liquid received by the first protruding section 52 flows on the first protruding section 52 from the second end portion 55 toward the first end portion 54. By this, the liquid received by the first protruding section 52 is introduced from the introduction chamber 42 into the first storage chamber 43.

The length of the horizontal component in the first protruding section 52 is longer than the length of the horizontal component in the open end 21. The horizontal component of the open end 21 is a first length L1. The first length L1 is, for example, a dimension in the horizontal direction D2 of the vertical portion 35. The distance in the horizontal direction D2 between the first end portion 54 and the open end 21 is a first distance L2. In this example, the length of the horizontal component of the first protruding section 52 is the sum of the first length L1 and the first distance L2. Therefore, in the present example, the length of the horizontal component of the first protruding section 52 is longer than the length of the horizontal component of the open end 21 by the first distance L2.

The distance in the vertical direction D1 between the open end 21 and the first protruding section 52 is smaller than the length of the horizontal component of the open end 21. The distance in the vertical direction D1 between the open end 21 and the first protruding section 52 is a second distance L3. The second distance L3 may be a distance between the open end 21 and the portion of the first protruding section 52 that is closest in the vertical direction D1 to the open end 21. The second distance L3 may be a distance between the open end 21 and the portion farthest in the vertical direction D1 from the open end 21. The second distance L3 is smaller than the first length L1.

The second protruding section 53 extends upward from the first protruding section 52. The second protruding section 53, for example, extends from an end portion of the first protruding section 52. The second protruding section 53, for example, extends from the second end portion 55. An end of the second protruding section 53 is connected to the second end portion 55. The second protruding section 53 extends in the vertical direction D1. The second protruding section 53 extends so as to bend from the first protruding section 52.

The second protruding section 53 is connected to, for example, the second introduction section 32. The second protruding section 53, for example, is connected to the vertical portion 35. The second protruding section 53 extends, for example, so as to extend the vertical portion 35. The second protruding section 53 is connected to the open end 21. An end portion of the second protruding section 53 is connected to the open end 21. The introduction chamber 42 and the first storage chamber 43 are partitioned by the first protruding section 52 and the second protruding section 53.

The second protruding section 53 has a proximal end 56 and a distal end 57. The proximal end 56 and the distal end 57 are end portions of the second protruding section 53. The proximal end 56 is connected to the second end portion 55, for example. The distal end 57 is connected to the open end 21, for example. The proximal end 56 is located below the distal end 57.

The second protruding section 53, for example, may not be connected to the open end 21. In this case, it is preferable that the second protruding section 53 extends from the first protruding section 52 so that the distal end 57 is positioned above the open end 21.

The distance in the horizontal direction D2 between the first end portion 54 and the open end 21 is greater than the distance in the horizontal direction D2 between the second end portion 55 and the open end 21. That is, the first distance L2 is larger than the distance between the second end portion 55 and the open end 21. In this example, since the second end portion 55 and the open end 21 overlap each other as viewed from the vertical direction D1, the distance in the horizontal direction D2 between the second end portion 55 and the open end 21 is 0.

As shown in FIG. 2, the tank unit 18 includes an atmosphere opening section 61. The atmosphere opening section 61 is configured to enable opening the inside of the storage section 19 to atmosphere. That is, the atmosphere opening section 61 can open the storage chamber 41 to atmosphere. The atmosphere opening section 61 includes, for example, a first atmosphere opening section 62 and a second atmosphere opening section 63.

The first atmosphere opening section 62 extends from the storage section 19. The first atmosphere opening section 62 is, for example, a tube. The first opening path 48 is opened to the first atmosphere opening section 62. Therefore, the first atmosphere opening section 62 opens the introduction chamber 42 and the first storage chamber 43 to atmosphere.

The second atmosphere opening section 63 extends from the storage section 19. The second atmosphere opening section 63 is, for example, a tube. A second opening path 49 is opened to the second atmosphere opening section 63. Therefore, the second atmosphere opening section 63 opens the second storage chamber 44 to atmosphere.

The atmosphere opening section 61 may include, for example, a third atmosphere opening portion that directly opens the introduction chamber 42 to atmosphere. The atmosphere opening section 61 may be connected to a connection tube to which a pump is connected. In this case, the pump may pressurize or depressurize each of the first storage chamber 43 and the second storage chamber 44.

The tank unit 18 includes a outlet section 64. The outlet section 64 is configured to guide out liquid stored in the storage section 19. The outlet section 64 leads out the liquid stored in the storage chamber 41.

The outlet section 64 extends from the storage section 19. The outlet section 64 is, for example, a tube. The outlet section 64 communicates with, for example, the second storage chamber 44. The outlet section 64 communicates with, for example, a lower portion of the second storage chamber 44. The supply flow path 22 is connected to the outlet section 64. The liquid stored in the second storage chamber 44 is supplied to the head 13 through the outlet section 64 and the supply flow path 22.

The tank unit 18 may include a connection 65. The connection 65 extends from the storage section 19. The connection 65 is, for example, a tube. The connection 65 communicates with the first storage chamber 43. The connection 65 communicates with, for example, a lower portion of the first storage chamber 43. A flow path, for example, extending from the head 13 is connected to the connection 65. In this case, the liquid can be introduced from the first storage chamber 43 to the head 13 through the connection 65. In addition, by returning the liquid from the head 13 to the storage section 19 through the connection 65, the liquid can be circulated between the head 13 and the storage section 19.

The tank unit 18 may include a remaining amount sensor 66. The remaining amount sensor 66 is a sensor that detects the remaining amount of the liquid stored in the storage section 19. The remaining amount sensor 66 detects the remaining amount by, for example, detecting the liquid level in the storage section 19. The remaining amount sensor 66 is located, for example, in the first storage chamber 43. When based on the detection result of the remaining amount sensor 66, the controller 25 grasps that the remaining amount of the liquid is very small, the controller 25 may, for example, cause the notification section 24 to notify using a message prompting replacement of the container 17.

Next, a case where the posture of the tank unit 18 is inclined will be described. The tank unit 18, for example, is easily inclined during transportation of the liquid ejection apparatus 11.

Figure 4:
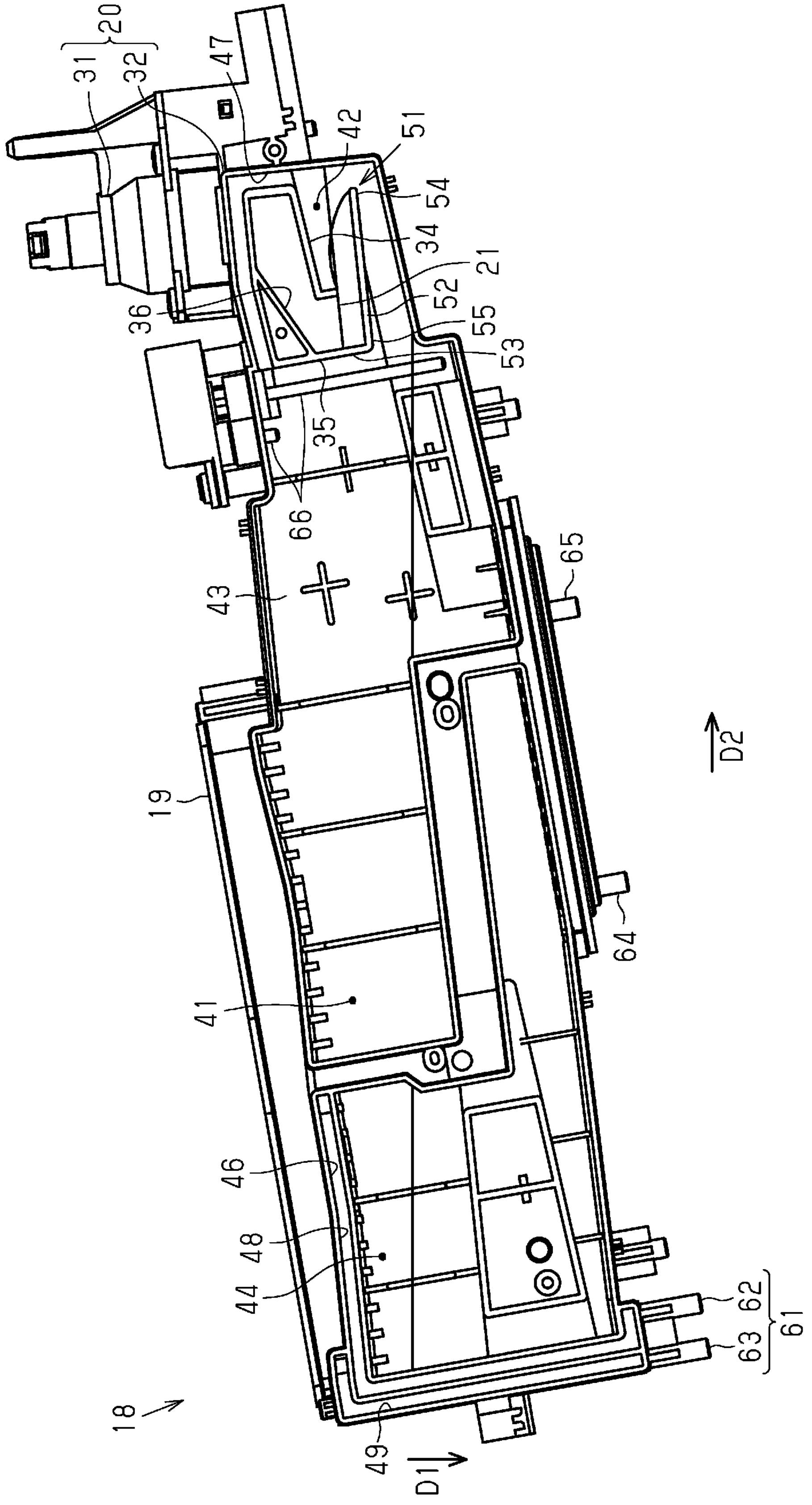
FIG. 4 is a front view of the tank unit tilted from the state shown in FIG. 2.

As shown in FIG. 4, when the posture of the tank unit 18 is inclined such that the introduction section 20 is displaced upward, that is, such that one end side (with respect to the reference line A1) of the storage section 19 is positioned higher than the other end side, the liquid accumulates in the blocking section 51. Specifically, liquid stored in the introduction chamber 42 and liquid introduced from the introduction section 20 accumulates in the blocking section 51. The open end 21 is blocked by the liquid that accumulates in the blocking section 51. That is, introduction of liquid is blocked by the liquid that accumulates in the blocking section 51. This reduces the concern that liquid will be introduced into the storage section 19 more than necessary. Therefore, the concern that the liquid level in the storage chamber 41 becomes high is reduced.

When the posture of the tank unit 18 is inclined such that the introduction section 20 is displaced downward, that is, such that one end side (with respect to the reference line A1) of the storage section 19 is positioned lower than the other end side, liquid flows from the first storage chamber 43 into the introduction chamber 42. In this case, since the open end 21 and the liquid surface do not separate from each other, the open end 21 remains blocked by the liquid. Therefore, in this case, there is no concern that the liquid is introduced into the storage section 19 more than necessary.

The inclination angle of the tank unit 18 at which the blocking section 51 blocks introduction of liquid is determined by the shapes, positions, and the like of the first protruding section 52 and the second protruding section 53. In this example, the blocking section 51 blocks introduction of liquid when the inclination angle of the tank unit 18 exceeds 8 degrees. When the inclination angle of the tank unit 18 is larger than 0 degrees and also equal to or smaller than 8 degrees, the blocking section 51 reduces the introduction speed of liquid. This is because when the tank unit 18 is inclined, the first protruding section 52 is inclined so that the first end portion 54 is displaced upward with respect to the second end portion 55. This makes it difficult for liquid to flow over the first protruding section 52. Therefore, the liquid level in the storage chamber 41 does not easily become high. When the first end portion 54 is positioned above the open end 21 by inclining the posture of the tank unit 18, liquid does not flow from the introduction chamber 42 to the first storage chamber 43. Actually, even when the first end portion 54 is located at a position lower than the open end 21, the introduction of the liquid is blocked by the surface tension of the liquid.

The greater the horizontal component of the length of the first protruding section 52, for example, the greater the sum of the first length L1 and the first distance L2, the less likely liquid will flow from the introduction chamber 42 to the first storage chamber 43 when the posture of the tank unit 18 is inclined. The greater the horizontal component of the length of the first protruding section 52, the greater displacement amount of the first end portion 54 with respect to the inclination angle of the tank unit 18 when the posture of the tank unit 18 is inclined. Therefore, the greater the length of the horizontal component in the first protruding section 52, the quicker the introduction of the liquid is blocked when the posture of the tank unit 18 is inclined. More specifically, the longer that the first distance L2 is than the first length L1, the more quickly that introduction of liquid is blocked when the posture of the tank unit 18 is inclined.

The shorter that the second distance L3 is, that is, the shorter that the distance in the vertical direction D1 is between the open end 21 and the first protruding section 52, the more difficult it is for liquid introduced from the introduction section 20 to pass between the open end 21 and the first protruding section 52 when the posture of the tank unit 18 is inclined. That is, the smaller that the second distance L3 is, the more difficult it is for air to flow from the storage section 19 to the container 17 when the posture of the tank unit 18 is inclined. Therefore, the smaller that the second distance L3 is, the more quickly that introduction of liquid is blocked when the posture of the tank unit 18 is inclined.

Next, operations and effects of the above-described embodiment will be described.

(1) The storage section 19 includes the blocking section 51 including the first protruding section 52 located at a position facing the open end 21 in the vertical direction D1 and the second protruding section 53 extending upward from the first protruding section 52. The length of the horizontal component in the first protruding section 52 is longer than the length of the horizontal component in the open end 21.

According to the above-described configuration, when the posture of the tank unit 18 is inclined, the liquid accumulates in the blocking section 51. The open end 21 is blocked by the liquid that accumulates in the blocking section 51. Accordingly, liquid is prevented from being introduced from the container 17 into the storage section 19. That is, the possibility that the liquid level in the storage section 19 becomes high is reduced. Therefore, the possibility that liquid will flow out from the head 13 is reduced.

(2) The distance in the vertical direction D1 between the open end 21 and the first protruding section 52 is smaller than the length of the horizontal component of the open end 21.

According to the above-described configuration, compared to a case where the distance in the vertical direction D1 between the open end 21 and the first protruding section 52 is greater than the length of the horizontal component in the open end 21, liquid accumulates more easily in the blocking section 51 when the posture of the tank unit 18 is inclined. Therefore, when the posture of the tank unit 18 has inclined, the open end 21 is blocked at a relatively early stage by the liquid that accumulated in the blocking section 51. Therefore, when the posture of the tank unit 18 is inclined, it is possible to suppress the possibility of liquid being introduced from the container 17 to the storage section 19 at a relatively early stage.

(3) The introduction section 20 is located closer in the horizontal direction D2 to the one end side of the storage section 19 than to an intermediate position of the storage section 19. The first protruding section 52 has a first end portion 54 and a second end portion 55. The second protruding section 53 extends from the second end portion 55.

According to the above configuration, when the posture of the tank unit 18 is inclined so that the introduction section 20 is displaced upward, liquid easily accumulates in the blocking section 51. Therefore, when the posture of the tank unit 18 is inclined such that the introduction section 20 is displaced upward, it is possible to reduce the likelihood of the liquid level in the storage section 19 becoming high.

(4) The distance in the horizontal direction D2 between the first end portion 54 and the open end 21 is greater than the distance between the second end portion 55 and the open end 21.

According to the above-described configuration, when the posture of the tank unit 18 is inclined such that the introduction section 20 is displaced upward, liquid more easily accumulates in the blocking section 51 compared to a case when the distance in the horizontal direction D2 between the first end portion 54 and the open end 21 is smaller than the distance in the horizontal direction D2 between the second end portion 55 and the open end 21. Therefore, when the posture of the tank unit 18 is inclined such that the introduction section 20 is displaced upward, it is possible to reduce the likelihood of the liquid level in the storage section 19 becoming high.

(5) The second protruding section 53 is connected to the open end 21.

According to the above configuration, when the posture of the tank unit 18 is inclined so that the introduction section 20 is displaced upward, liquid easily accumulates in the blocking section 51. Therefore, when the posture of the tank unit 18 is inclined such that the introduction section 20 is displaced upward, it is possible to reduce the likelihood of the liquid level in the storage section 19 becoming high.

(6) The introduction section 20 includes the horizontal portion 34 extending in the horizontal direction D2 and the vertical portion 35 extending in the vertical direction D1.

According to the above-described configuration, since the introduction section 20 has the horizontal portion 34, the first protruding section 52 can be disposed in the storage section 19 elongated in the horizontal direction D2. Therefore, when the posture of the tank unit 18 inclines, the open end 21 is blocked at a relatively early stage by the liquid that accumulates in the blocking section 51. Therefore, when the posture of the tank unit 18 is inclined, it is possible to suppress the possibility of liquid being introduced from the container 17 to the storage section 19 at a relatively early stage.

(7) The controller 25 prohibits printing when the inclination angle of the tank unit 18 exceeds a predetermined angle.

In a state in which the posture of the tank unit 18 is inclined, there is a concern that the liquid will not be normally guided from the storage section 19 to the head 13 due to a rise in the liquid surface in the storage section 19. According to the configuration described above, by prohibiting printing when liquid is not properly led out from the storage section 19 to the head 13, a concern that liquid will be wastefully consumed is reduced.

(8) When the inclination angle of the tank unit 18 exceeds the predetermined angle, the controller 25 causes the notification section 24 to notify a request to reduce the inclination angle of the tank unit 18.

According to the above configuration, it is possible to request the user to mitigate the inclination angle of the tank unit 18. Accordingly, the liquid ejection apparatus 11 can operate in an appropriate environment.

The present embodiment can be modified as follows. The present embodiment and the following modifications can be implemented in combination with each other within a range where there is no technical contradiction.

Figure 5:
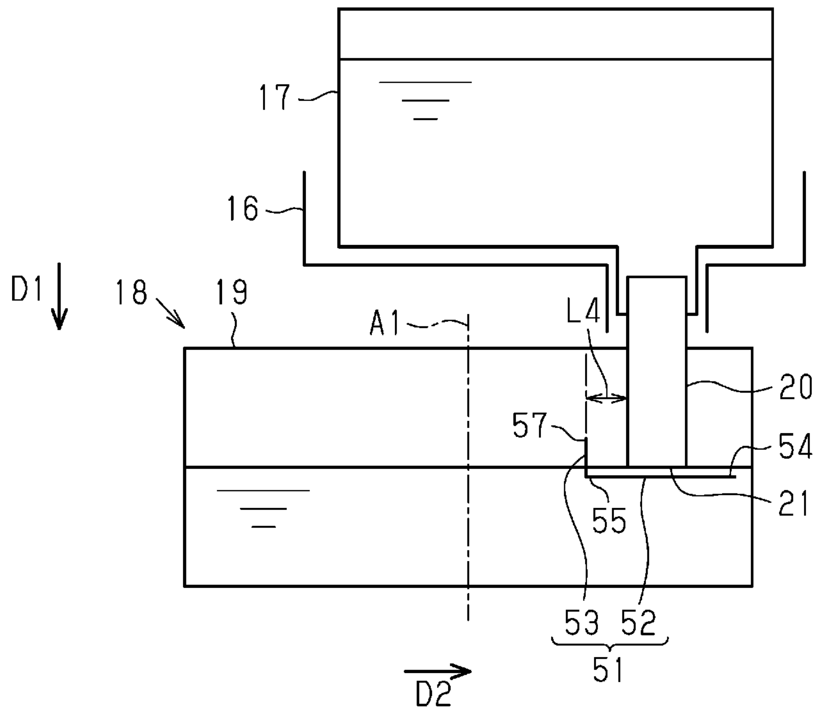
FIG. 5 is a schematic view showing a modified example of the tank unit.

As shown in FIG. 5, the second protruding section 53 may not be connected to the open end 21, and may, for example, extend upward from the first protruding section 52 along the introduction section 20. The distal end 57 is located above the open end 21. In this modification, the distance in the horizontal direction D2 between the second end portion 55 and the open end 21 is not 0 but a third distance L4. In this modification, the distance in the horizontal direction D2 between the reference line A1 and the second end portion 55 is shorter than the distance in the horizontal direction D2 between the reference line A1 and the open end 21. For example, the distance in the horizontal direction D2 between the first end portion 54 and the open end 21 is greater than the third distance L4.

Figure 6:
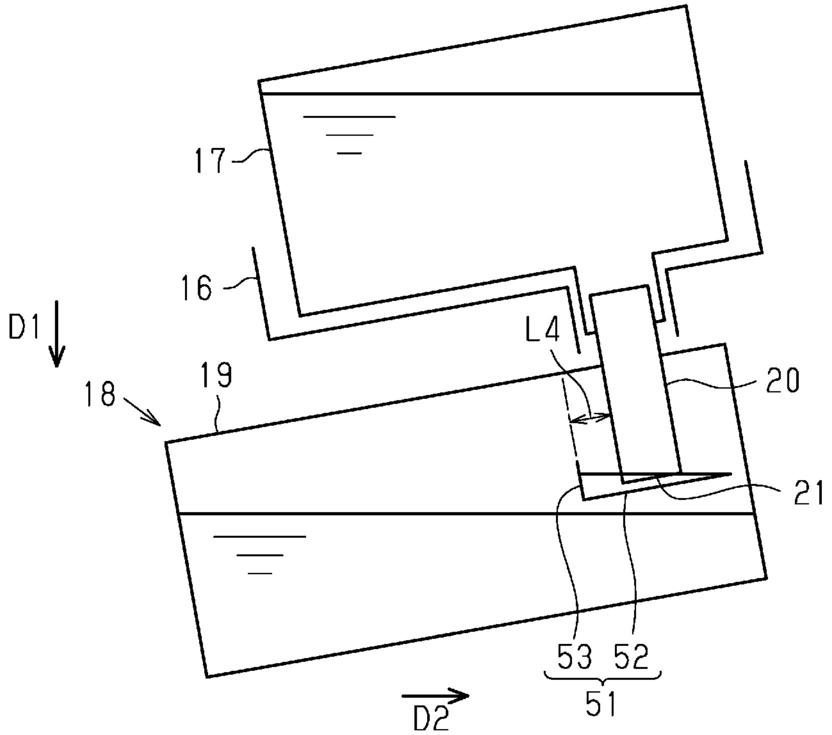
FIG. 6 is a schematic view of the tank unit tilted from the state shown in FIG. 5.

As shown in FIG. 6, when the posture of the tank unit 18 is inclined so that the introduction section 20 is displaced upward, liquid accumulates in the blocking section 51. The open end 21 is blocked by the liquid that accumulated in the blocking section 51. Therefore, when the posture of the tank unit 18 inclines, the introduction of the liquid is blocked. This reduces the concern that liquid will be introduced more than necessary into the storage section 19.

The liquid ejected by the head 13 is not limited to ink, and may be, for example, a liquid material in which particles of a functional material are dispersed in or mixed with a liquid. For example, the head 13 may eject a liquid material containing a material, in a dispersed or dissolved form, such as an electrode material or a pixel material used for manufacturing liquid crystal displays, electroluminescence displays, or surface light emission displays.

Hereinafter, technical ideas grasped from the above-described embodiment and modified examples and effects thereof will be described.

(A) A tank unit configured to introduce liquid supplied from a container and to lead out liquid toward a head configured to eject the liquid, the tank unit including a storage section that stores the liquid supplied from the container, an introduction section that introduces the liquid supplied from the container into the storage section using a hydraulic head difference, an atmosphere opening section configured to open inside of the storage section to atmosphere, and an outlet section that leads out the liquid stored in the storage section, wherein the introduction section is connected to the storage section, extends in a vertical direction in the storage section, and has an open end located within the storage section, the storage section includes a blocking section including a first protruding section located at a position facing the open end in the vertical direction and a second protruding section extending upward from the first protruding section, and a length of a horizontal component in the first protruding section is longer than a length of a horizontal component in the open end.

According to the above-described configuration, when the posture of the tank unit is inclined, the liquid accumulates in the blocking section. The open end is blocked by the liquid that accumulates in the blocking section. Accordingly, liquid is prevented from being introduced from the container into the storage section. That is, the possibility that the liquid level in the storage section becomes high is reduced. Therefore, the possibility that liquid will flow out from the head is reduced.

(B) In the above tank unit, a distance in the vertical direction between the open end and the first protruding section may be smaller than the length of the horizontal component in the open end.

According to the above configuration, when the posture of the tank unit has inclined, the open end is blocked at a relatively early stage by the liquid that accumulated in the blocking section. Therefore, when the posture of the tank unit is inclined, it is possible to suppress the possibility of liquid being introduced from the container to the storage section at a relatively early stage.

(C) The above tank unit, wherein the introduction section may be located closer in a horizontal direction to one end side of the storage section than to an intermediate position of the storage section, the first protruding section may have a first end portion and a second end portion, the first end portion may be an end portion that is farther in the horizontal direction from the intermediate position among both ends of the first protruding section, the second end portion may be an end portion that is closer in the horizontal direction to the intermediate position among both ends of the first protruding section, and the second protruding section may extend from the second end portion.

According to the above configuration, when the posture of the tank unit is inclined so that the introduction section is displaced upward, liquid easily accumulates in the blocking section. Therefore, when the posture of the tank unit is inclined such that the introduction section is displaced upward, it is possible to reduce the likelihood of the liquid level in the storage section becoming high.

(D) In the above tank unit, a distance in the horizontal direction between the first end portion and the open end may be greater than a distance between the second end portion and the open end.

According to the above configuration, when the posture of the tank unit is inclined so that the introduction section is displaced upward, liquid easily accumulates in the blocking section. Therefore, when the posture of the tank unit is inclined such that the introduction section is displaced upward, it is possible to reduce the likelihood of the liquid level in the storage section becoming high.

(E) In the tank unit, the second protruding section may be connected to the opening end.

According to the above configuration, when the posture of the tank unit is inclined so that the introduction section is displaced upward, liquid easily accumulates in the blocking section. Therefore, when the posture of the tank unit is inclined such that the introduction section is displaced upward, it is possible to reduce the likelihood of the liquid level in the storage section becoming high.

(F) In the above tank unit, the introduction section may include a horizontal portion extending in a horizontal direction and a vertical portion extending in the vertical direction According to the above-described configuration, since the introduction section has the horizontal portion, the first protruding section can be disposed in the storage section elongated in the horizontal direction. Therefore, when the posture of the tank unit has inclined, the open end is blocked at a relatively early stage by the liquid that accumulated in the blocking section. Therefore, when the posture of the tank unit inclines, it is possible to suppress the possibility of liquid being introduced from the container to the storage section at a relatively early stage.

(G) A liquid ejection apparatus includes the tank unit described above, and a head that ejects liquid supplied from the tank unit.

According to the above configuration, the same effects as those of the above-described tank unit can be obtained.

(H) The liquid ejection apparatus may include a detection section that detects an inclination angle of the tank unit with respect to horizontal and a controller, wherein the controller prohibits printing when the inclination angle of the tank unit exceeds a predetermined angle.

In a state in which the posture of the tank unit is inclined, there is a concern that the liquid will not be normally guided from the storage section to the head due to a rise in the liquid surface in the storage section. According to the configuration described above, by prohibiting printing when liquid is not properly led out from the storage section to the head, a concern that liquid will be wastefully consumed is reduced.

(I) The liquid ejection apparatus may include a notification section that notifies the user of information, wherein when the inclination angle of the tank unit exceeds the predetermined angle, the controller causes the notification section to notify a request for reducing the inclination angle of the tank unit.

According to the above configuration, it is possible to request the user to mitigate the inclination angle of the tank unit. Accordingly, the liquid ejection apparatus can operate in an appropriate environment.

What is claimed is:

1. A tank unit configured to introduce liquid supplied from a container and to lead out liquid toward a head configured to eject the liquid, the tank unit comprising:
- a storage section that stores the liquid supplied from the container;
- an introduction section that introduces the liquid supplied from the container into the storage section using a hydraulic head difference;
- an atmosphere opening section configured to open an inside of the storage section to atmosphere; and
- an outlet section that leads out the liquid stored in the storage section, wherein
- the introduction section
  - is connected to the storage section,
  - extends in a vertical direction in the storage section, and
  - has an open end located within the storage section,
- the storage section includes a blocking section including a first protruding section located at a position facing the open end in the vertical direction and a second protruding section extending upward from the first protruding section, and
- a length of a horizontal component in the first protruding section is longer than a length of a horizontal component in the open end.

2. The tank unit according to claim 1, wherein
- a distance in the vertical direction between the open end and the first protruding section is smaller than the length of the horizontal component in the open end.

3. The tank unit according to claim 1, wherein
- the introduction section is located closer in a horizontal direction to one end side of the storage section than to an intermediate position of the storage section,
- the first protruding section has a first end portion and a second end portion,
- the first end portion is an end portion that is farther in the horizontal direction from the intermediate position among both ends of the first protruding section,
- the second end portion is an end portion that is closer in the horizontal direction from the intermediate position among both ends of the first protruding section, and
- the second protruding section extends from the second end portion.

4. The tank unit according to claim 3, wherein
- a distance in the horizontal direction between the first end portion and the open end is greater than a distance in the horizontal direction between the second end portion and the open end.

5. The tank unit according to claim 3, wherein
- the second protruding section is connected to the open end.

6. The tank unit according to claim 1, wherein
- the introduction section includes a horizontal portion extending in a horizontal direction and a vertical portion extending in the vertical direction.

7. A liquid ejection apparatus, comprising:
- the tank unit according to claim 1 and
- a head that ejects liquid supplied from the tank unit.

8. The liquid ejection apparatus according to claim 7, further comprising:
- a detection section that detects an inclination angle of the tank unit with respect to horizontal and
- a controller,
- wherein the controller prohibits printing when the inclination angle of the tank unit exceeds a predetermined angle.

9. The liquid ejection apparatus according to claim 8, further comprising:
- a notification section that notifies a user of information,
- wherein when the inclination angle of the tank unit exceeds the predetermined angle, the controller causes the notification section to notify a request for reducing the inclination angle of the tank unit.

* * * * *